(12) United States Patent
Wang et al.

(10) Patent No.: US 10,111,263 B2
(45) Date of Patent: Oct. 23, 2018

(54) METHOD AND SYSTEM FOR NETWORK INTERCONNECTION BETWEEN DEVICES

(71) Applicant: TENCENT TECHNOLOGY (SHENZHEN) COMPANY LIMITED, Shenzhen, Guangdong (CN)

(72) Inventors: Yue Wang, Shenzhen (CN); Qianqian Zhao, Shenzhen (CN); Xuemin Ma, Shenzhen (CN); Wenqing Xue, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 203 days.

(21) Appl. No.: 15/202,336

(22) Filed: Jul. 5, 2016

(65) Prior Publication Data

US 2016/0316507 A1 Oct. 27, 2016

Related U.S. Application Data

(63) Continuation of application No. PCT/CN2015/070930, filed on Jan. 16, 2015.

(30) Foreign Application Priority Data

Jan. 16, 2014 (CN) .......................... 2014 1 0020399

(51) Int. Cl.
*H04W 4/00* (2018.01)
*H04W 76/02* (2009.01)
(Continued)

(52) U.S. Cl.
CPC ....... *H04W 76/023* (2013.01); *H04L 12/6418* (2013.01); *H04L 67/1095* (2013.01);
(Continued)

(58) Field of Classification Search
CPC ... H04W 76/023; H04W 76/14; H04W 8/005; H04L 67/1095; H04L 67/16; H04L 12/6418
See application file for complete search history.

(56) References Cited

U.S. PATENT DOCUMENTS

| | | | | |
|---|---|---|---|---|
| 2002/0035621 | A1* | 3/2002 | Zintel ................. | H04L 12/2805 709/220 |
| 2005/0022210 | A1* | 1/2005 | Zintel ................. | H04L 12/2803 719/318 |
| 2005/0097503 | A1* | 5/2005 | Zintel ................. | H04L 12/2803 717/100 |

FOREIGN PATENT DOCUMENTS

| | | |
|---|---|---|
| CN | 102682597 A | 9/2012 |
| CN | 103051698 A | 4/2013 |

OTHER PUBLICATIONS

International Search Report Issued in International Application No. PCT/CN2015/070930 dated Apr. 24, 2015, in 2 pages.
(Continued)

*Primary Examiner* — Clemence S Han
(74) *Attorney, Agent, or Firm* — Knobbe Martens Olson & Bear LLP

(57) ABSTRACT

A method and a system for network interconnection between devices may include: establishing a connection between a current device and a remote device in at least one preset connection manner; parsing operation data obtained by collection to obtain event information triggered in the current device, where the operation data is generated by an operation triggered in the current device; and synchronizing the event information to the remote device via the established connection, so as to synchronize the operation triggered in the current device to the remote device. By utilizing the present method and system, operations of interconnection between devices are simplified.

6 Claims, 7 Drawing Sheets

(51) Int. Cl.
*H04L 12/64* (2006.01)
*H04L 29/08* (2006.01)
*H04W 8/00* (2009.01)
*H04W 76/14* (2018.01)

(52) U.S. Cl.
CPC ............. *H04L 67/16* (2013.01); *H04W 8/005* (2013.01); *H04W 76/14* (2018.02)

(56) References Cited

OTHER PUBLICATIONS

International Preliminary Report on Patentability Issued in International Application No. PCT/CN2015/070930 dated Jul. 19, 2016, in 5 pages.

* cited by examiner

METHOD AND SYSTEM FOR NETWORK INTERCONNECTION BETWEEN DEVICES

CROSS-REFERENCE TO RELATED APPLICATIONS

This application is a continuation of, and claims priority to, Application No. PCT/CN2015/070930, filed on Jan. 16, 2015. This application further claims priority to Chinese Patent Application No. 201410020399.X, titled "METHOD AND SYSTEM FOR NETWORK INTERCONNECTION BETWEEN DEVICES" and filed on Jan. 16, 2014. The entire disclosures of each of the above applications are hereby incorporated by reference in their entirety for all purposes.

BACKGROUND

Field

The present disclosure relates to network application technologies, and in particular, to a method and a system for network interconnection between devices.

Description of the Related Art

The development of various applications in devices has resulted in increasingly frequent video and image transmission between the devices via interconnection therebetween, and therefore, interconnection between devices is becoming more important.

However, due to factors such as different operating systems, it is usually difficult to achieve a connection between devices. Even, a user usually needs to consider conditions of two devices to achieve a connection therebetween in an appropriate connection manner, for example, the user fully considers operating systems in the two devices, or separately acquires and inputs network addresses of the two devices, and then attempts to achieve a successful connection between the two devices in one or more connection manners, which results in complicated operations.

SUMMARY

In view of the above, it is necessary to provide a method for network interconnection between devices, which can simplify operations.

In addition, it is further necessary to provide a system for network interconnection between devices, which can simplify operations.

A method for network interconnection between devices includes the following steps: establishing a connection between a current device and a remote device in at least one preset connection manner; parsing operation data obtained by collection to obtain event information triggered in the current device, where the operation data is generated by an operation triggered in the current device; and synchronizing the event information to the remote device via the established connection, so as to synchronize the operation triggered in the current device to the remote device.

A method for network interconnection between devices includes the following steps: establishing a connection between a current device and a remote device in at least one preset connection manner; parsing operation data obtained by collection to obtain event information triggered in the current device, where the operation data is generated by an operation triggered in the current device; synchronizing the event information to the remote device via the established connection, so as to synchronize the operation triggered in the current device to the remote device; and receiving the event information by using the remote device, and responding, in the remote device according to the event information, to the operation triggered in the current device.

A system for network interconnection between devices includes: a connection establishment module, configured to establish a connection between a current device and a remote device in at least one preset connection manner; a parsing module, configured to parse operation data obtained by collection to obtain event information triggered in the current device, where the operation data is generated by an operation triggered in the current device; and a synchronization module, configured to synchronize the event information to the remote device via the established connection, so as to synchronize the operation triggered in the current device to the remote device.

A system for network interconnection between devices includes: a connection establishment module, configured to establish a connection between a current device and a remote device in at least one preset connection manner; a parsing module, configured to parse operation data obtained by collection to obtain event information triggered in the current device, where the operation data is generated by an operation triggered in the current device; a synchronization module, configured to synchronize the event information to the remote device via the established connection, so as to synchronize the operation triggered in the current device to the remote device; and a synchronization and responding module, configured to receive the event information, and respond, in the remote device according to the event information, to the operation triggered in the current device, where the connection establishment module, the parsing module, and the synchronization module run in the current device, and the synchronization and responding module runs in the remote device.

In the method and system for network interconnection between devices, a connection between a current and a remote device is established in the current device in at least one preset connection manner, operation data obtained by collection is parsed to obtain event information triggered in the current device, and then the event information is transmitted to the remote device via the established connection, so as to synchronize an operation corresponding to the operation data to the remote device. Because multiple preset connection manners are automatically used one by one until the current device is successfully connected to the remote device, operations are greatly simplified, and a user does not need to consider conditions of the current device and the remote device to select connection manners and manually try the connection manners one by one; and moreover, operation synchronization between the current device and the remote device is implemented, thereby extending types of data that can be transmitted between devices.

DETAILED DESCRIPTION

Figure 1:
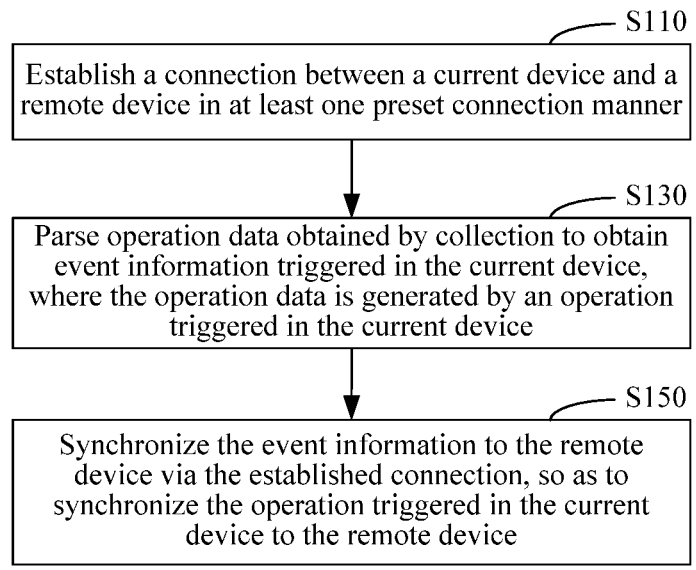
FIG. 1 is a flowchart of a method for network interconnection between devices according to an embodiment.

In order to make the objectives, technical solutions, and advantages of the present disclosure more comprehensible, the present disclosure is described in further detail below with reference to embodiments and the accompanying drawings. It should be understood that, the specific embodiments described herein are only intended to explain the present disclosure, rather than to limit the present disclosure.

Unless specific and clear description is given in the context, there may be one or multiple elements and components in the present disclosure, which is not limited in the present disclosure. Reference numerals are used to arrange steps in the present disclosure, but are not intended to limit the sequential order of the steps. Unless the order of the steps are specified or it is clearly pointed out that one of the steps needs to be performed based on another step, the relative order of the steps may be adjusted. It should be understood that, the term "and/or" as used herein refers to and encompasses any and all possible combinations of one or more of the associated listed items.

As shown in FIG. 1, in an embodiment, a method for network interconnection between devices includes the following steps:

Step S110: Establish a connection between a current device and a remote device in at least one preset connection manner.

In this embodiment, multiple connection manners are preset. During connection establishment between the current device and the remote device, the current device establishes a connection between the current device and the remote device by sequentially using multiple preset connection manners, till the current device is successfully connected to the remote device.

Specifically, the multiple preset connection manners are used one by one in a use sequence corresponding to the connection manners, and after the current device is successfully connected to the remote device in a certain connection manner, the next connection manner is not used.

Step S130: Parse operation data obtained by collection to obtain event information triggered in the current device, where the operation data is generated by an operation triggered in the current device.

In this embodiment, various sensors are built in the current device to collect an operation triggered in the current device by a user, to obtain corresponding operation data. In this case, the current device parses the operation data obtained by collection, to obtain corresponding event information, and then responds to and gives feedback on the operation of the user according to the event information.

Step S150: Synchronize the event information to the remote device via the established connection, so as to synchronize the operation triggered in the current device to the remote device.

In this embodiment, the event information is synchronized to the remote device via the connection successfully established between the current device and the remote device, so that the remote device responds to and gives feedback on the operation triggered in the current device by the user.

With the above technical solution, an operation triggered in a current device can be synchronized to a remote device, and then the remote device responds to the operation and gives feedback to a user who triggers the operation. For example, sensing devices such as a gyroscope, a gravity sensor, and a light sensor are built in the current device, so as to collect various operations triggered in the current device by the user. For example, when the user picks up the current device and waves it in the air, data about a change in the gyroscope is acquired, that is, data of a track of the current device across the air, where the data of the track is operation data. In this case, the operation data is parsed to obtain corresponding event information, and the event information is transmitted to the remote device via the connection established with the remote device, where the remote device may be a computer; and in this case, the computer that receives the event information controls a mouse cursor to move along the track corresponding to the event information, so as to synchronize the operation of the user in the current device to the remote device, thereby implementing operation synchronism between devices.

Figure 2:
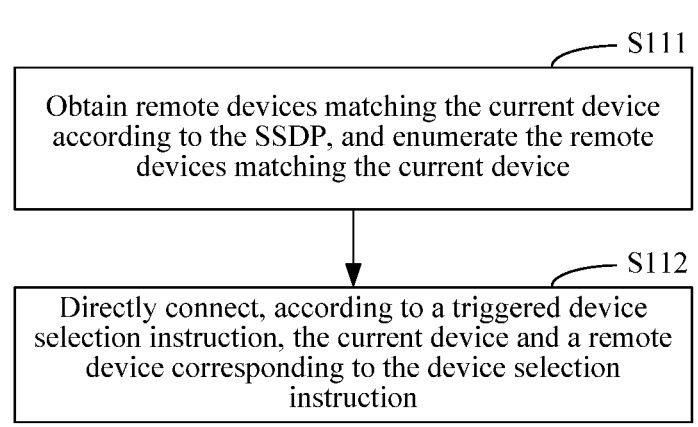
FIG. 2 is a flowchart of a method for establishing a connection between a current device and a remote device in at least one preset connection manner according to an embodiment.

As shown in FIG. 2, in an embodiment, the connection manner includes a direct device connection, and step S110 includes:

Step S111: Obtain, according to the Simple Service Discovery Protocol (SSDP), remote devices matching the current device, and enumerate the remote devices matching the current device.

In this embodiment, the SSDP is a simple device discovery protocol in a Universal Plug and Play (uPnP) protocol stack.

Specifically, devices that support the SSDP all mark provided service types by using a ssdp:alive method in the SSDP, and broadcast a message through specific ports in network segments, where the broadcast message includes information such as an address and the provided service types.

In this case, the current device searches, by using a ssdp:search method and according to the service types in the message, a network segment the current device is in for devices that use a same protocol, that is, devices that provide the same service types, where the devices are remote devices matching the current device.

There are generally multiple remote devices that match the current device and obtained from the same network segment, and in this case, the multiple obtained remote devices matching the current device are enumerated, so that a user having the current device performs selection from the multiple remote devices.

Step S112: Directly connect, according to a triggered device selection instruction, the current device and a remote device corresponding to the device selection instruction.

In this embodiment, a device selection operation performed by the user on the enumerated multiple remote devices matching the current device is acquired, to obtain a device selection instruction, so as to directly connect the current device and the corresponding remote device according to the device selection instruction, thereby achieving a connection between the current device and the remote device.

Figure 3:
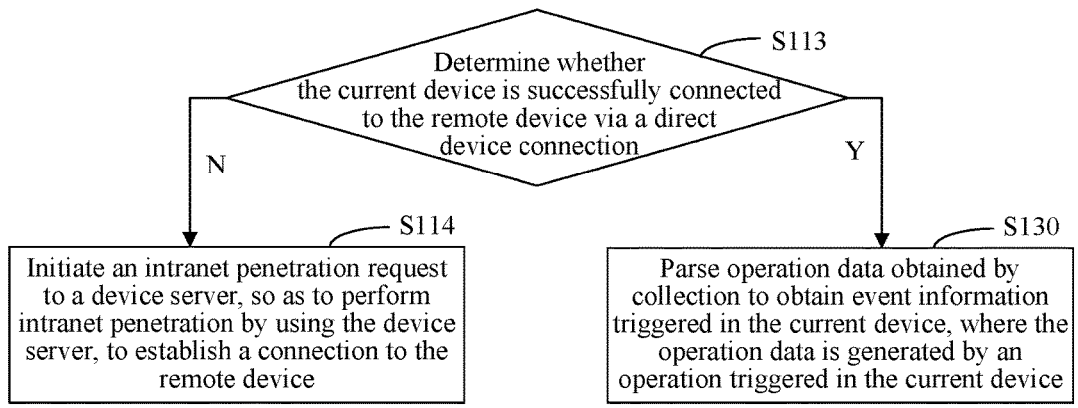
FIG. 3 is a flowchart of a method for establishing a connection between a current device and a remote device in at least one preset connection manner according to another embodiment.

As shown in FIG. 3, in an embodiment, the connection manner includes an intranet penetration manner, and step S110 includes:

Step S113: Determine whether the current device is successfully connected to the remote device via the direct device connection; if not, step S114 is performed; and if yes, step S130 is performed.

In this embodiment, among the multiple preset connection manners, a direct device connection manner is first used to make a connection attempt. Therefore, a connection manner of a direct device connection is first used to establish a connection between the current device and the remote device, and when the current device fails to be successfully connected to the remote device via the connection manner of a direct device connection, step S114 is performed, so as to establish a connection between the current device and the remote device in an intranet penetration manner.

When it is determined that the current device fails to be successfully connected to the remote device via the direct device connection, it indicates that the current device and the remote device are not in the same network segment, which results in an unsuccessful direction connection. The current device and the remote device that are not in the same network segment are in two different routing environments, and therefore, an attempt to establish a connection with the remote device is made in a connection manner of intranet penetration.

Step S114: Initiate an intranet penetration request to a device server, so as to perform intranet penetration by using the device server, to establish a connection with the remote device.

In this embodiment, the device server is used to implement intranet penetration between the current device and the remote device, so that the current device can establish a connection with the remote device.

The current device and the remote device that are in different routing environments cannot directly communicate with each other to send information to each other, and both the routing environment the current device is in and the routing environment the remote device is in only allow automatically and externally sent information to pass through them. Therefore, information directly sent from the current device to the remote device and information directly sent from the remote device to the current device are both discarded because a router considers that they are untrusted.

Therefore, to achieve communication between the current device and the remote device, the current device is connected to a device server, so as to initiate an intranet penetration request to the device server, where the intranet penetration request includes a network address and a port number of the current device.

Correspondingly, the remote device also initiates an intranet penetration request to the device server, so as to notify the device server of a network address and a port number of the remote device.

In this case, the current device and the remote device both have sent information externally, a channel allowing data to come in and go out exists on each corresponding route, and the current device and the remote device both acquire the network address and the port number of each other by using the device server; therefore, a connection between the current device and the remote device can be directly established.

Figure 4:
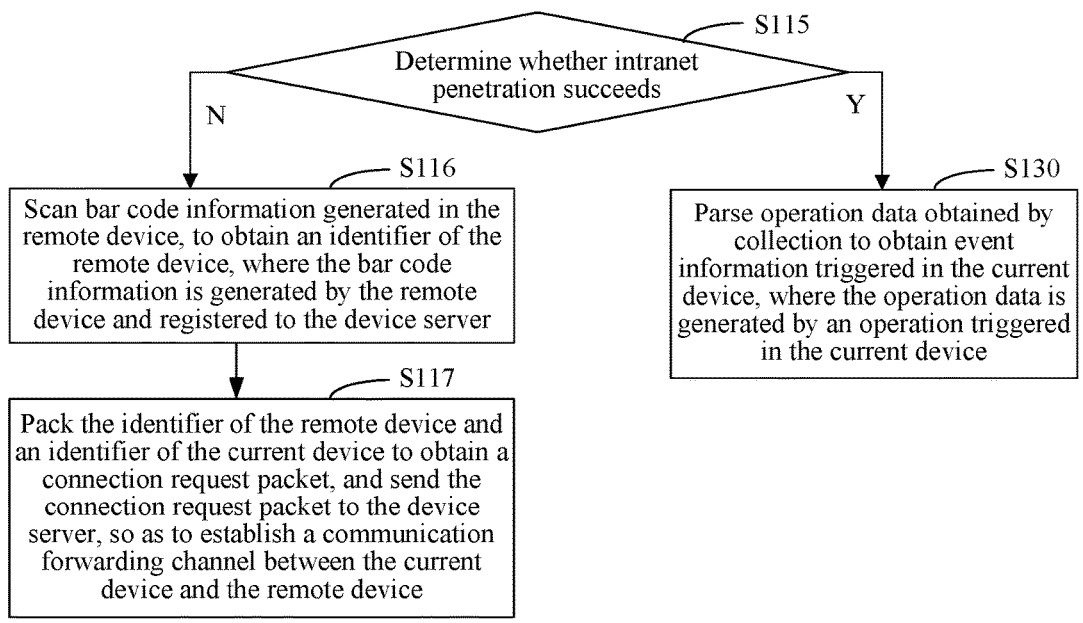
FIG. 4 is a flowchart of a method for establishing a connection between a current device and a remote device in at least one preset connection manner according to another embodiment.

As shown in FIG. 4, in an embodiment, the connection manner includes background transfer, and step S110 includes:

Step S115: Determine whether intranet penetration succeeds; if not, step S116 is performed; and if yes, step S130 is performed.

In this embodiment, among the multiple preset connection manners, the connection manner of a direct device connection is used before the connection manner of intranet penetration. Therefore, during an attempt to establish a connection between the current device and the remote device in the connection manner of intranet penetration, if connection establishment fails, step S116 is performed, so as to make an attempt to establish a connection between the current device and the remote device in a background transfer manner.

Step S116: Scan bar code information generated in the remote device, to obtain an identifier of the remote device, where the bar code information is generated by the remote device and registered to the device server.

In this embodiment, after a connection between the current device and the remote device fails to be successfully established by means of intranet penetration, the remote device generates bar code information, a page displayed by the remote device is switched to a code scanning page including the bar code information, and the bar code information is registered to the device server, so that the device server acquires a network address and an identifier (GUID, Globally Unique Identifier) of the remote device.

In this case, the current device enables a code scanning function, so as to scan the bar code information on the code scanning page displayed by the remote device. In a preferred embodiment, the bar code information is two-dimensional code information.

Step S117: Pack the identifier of the remote device and an identifier of the current device to obtain a connection request packet, and send the connection request packet to the device server, so as to establish a communication forwarding channel between the current device and the remote device.

In this embodiment, the current device obtains the identifier of the remote device by scanning the bar code information, packs the identifier of the remote device and the identifier of the current device to obtain a connection request packet, and send the connection request packet to the device server. In this case, the remote device has registered the bar code information to the device server after generating the bar code information; therefore, the device server can obtain the identifier of the current device and the identifier of the remote device by extraction from the received connection request packet initiated by the current device, and then obtain a network address of the remote device according to the identifier of the remote device, so as to establish and maintain the communication forwarding channel between the remote device and the current device.

During establishment of a connection between the current device and the remote device in the connection manner of background transfer, the device server is in charge of searching for two devices that match each other, that is, the current device and the remote device, establishing and maintaining the communication forwarding channel, and forwarding information between the current device and the remote device, so that the current device can receive information that is sent from the remote device to the device server and forwarded by the device server, and the remote device can also receive information that is sent from the current device to the device server and forwarded by the device server.

During an attempt to establish a connection between the current device and the remote device in a connection manner of a direct device connection, in a connection manner of intranet penetration, or in a connection manner of background transfer, the direct device connection is the fastest in connection speed, the intranet penetration is slower, and the background transfer is the slowest; and therefore, a sequence of using the connection manners is set as follows: the connection manner of a direct device connection is first used, and then the connection manner of intranet penetration is used, and the connection manner of background transfer is used in the last, so as to first attempt to establish a connection between the current device and the remote device in the fastest connection manner, thereby ensuring that the connection between the current device and the remote device is completed as fast as possible.

In an embodiment, before step S150, the method further includes:

a step of performing packet assembly on the event information in a sequential generation order at a preset frequency and performing compression to obtain a compressed package.

In this embodiment, the current device that has multiple built-in sensors used to collect operation data samples the operation data at an extremely high frequency, such as near 100 Hz per second, and multiple pieces of event information obtained by parsing the operation data are assembled into one or more data packets for transmission.

A preset frequency is a frequency at which packet assembly is performed on the event information, which is less than the frequency at which the operation data is sampled, so as to avoid frequent packet transmission caused by a high packet assembly frequency and further avoid network congestion. For example, the preset frequency may be 2 to 10 packets per second, thereby ensuring a smooth feature, that is, smoothness, of responding and feeding back according to the event information by the remote device.

Specifically, a preset number of pieces of event information obtained by parsing are assembled into a queue in a sequential order, to form a data packet, and then packet assembly is performed on the data packet at a preset frequency and compression is further performed, so as to avoid occupation of excessive network resources during sending of an excessively large data packet.

Further, a specific process of step S150 is: synchronizing the compressed package including event information to the remote device via the established connection.

In this embodiment, the compressed package obtained by packet assembly and compression is transmitted to the remote device via the established connection, so that the remote device responds to the operation triggered in the current device.

Figure 5:
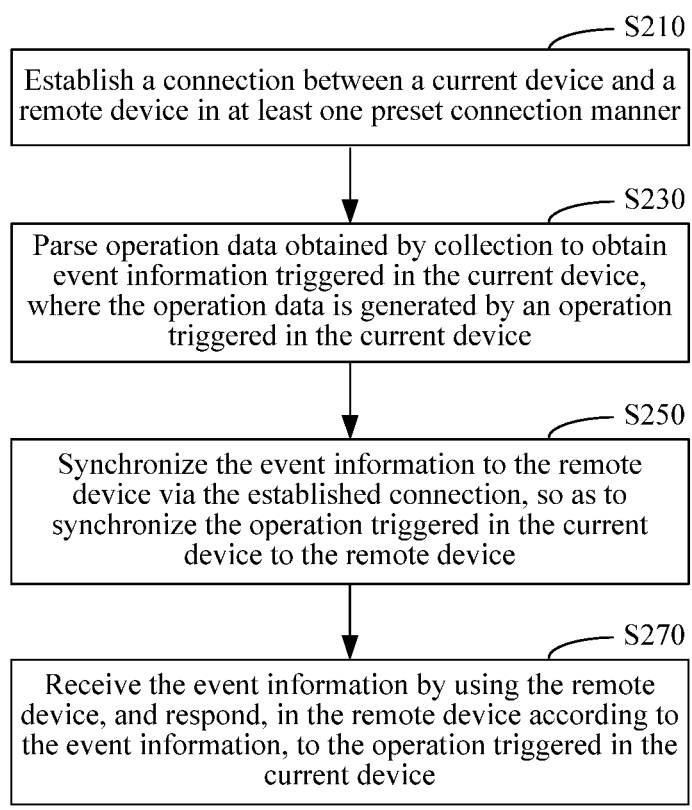
FIG. 5 is a flowchart of a method for network interconnection between devices according to another embodiment.

As shown in FIG. 5, in an embodiment, a method for network interconnection between devices runs in a current device and a remote device, and includes the following steps:

Step S210: Establish a connection between the current device and the remote device in at least one preset connection manner.

Step S230: Parse operation data obtained by collection to obtain event information triggered in the current device, where the operation data is generated by an operation triggered in the current device.

Step S250: Synchronize the event information to the remote device via the established connection, so as to synchronize the operation triggered in the current device to the remote device.

Step S270: Receive the event information by using the remote device, and respond, in the remote device according to the event information, to the operation triggered in the current device.

Figure 6:
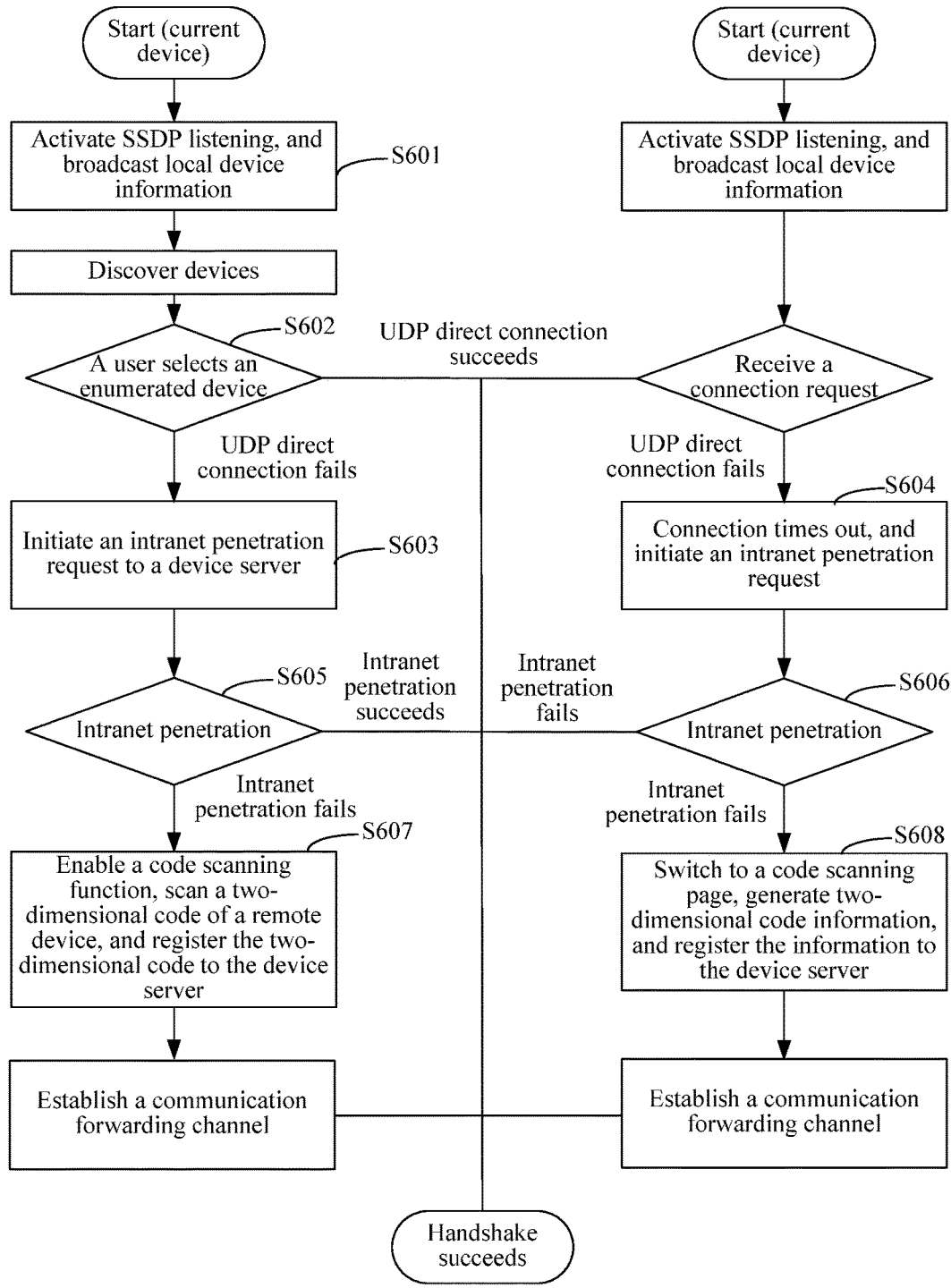
FIG. 6 is a schematic diagram of interaction between a current device and a remote device according to an embodiment.

The method for network interconnection between devices is described in detail below with reference to a specific embodiment. In this embodiment, a current device and a remote device achieve connection by using the above method for network interconnection between devices. As shown in FIG. 6, in order to establish a network connection with the remote device, the current device first performs step S601: activate SSDP listening, broadcast local device information, to search for devices, and enumerate the found devices to a user; as described in step S602, the user triggers a device selection instruction, to perform selection to obtain an enumerated remote device, and then a UDP direct connection is established between the current device and the selected remote device, where if UDP direct connection succeeds, it indicates that a handshake between the current device and the remote device succeeds and network connection can be successfully established.

If the UDP direction connection fails, the current device performs step S603: initiate an intranet penetration request to a device server; and correspondingly, the remote device performs step S604: initiate an intranet penetration request to the device server, so that the current device and the remote device both acquire a network address and a port number of each other by using the device server, to establish a connection between the current device and the remote device.

The current device then performs step S605, and the remote device performs step S606, to determine whether intranet penetration succeeds; if yes, it indicates that a handshake between the current device and the remote device succeeds and a connection is established therebetween; and if not, the current device performs step S607: enable a code scanning function, to scan a two-dimensional code generated by the remote device, and register the two-dimensional code in the device server, so that the device serer obtains an identifier of the remote device and an identifier of the current device.

Correspondingly, the remote device performs step S608: switch to a code scanning page including the two-dimensional code, generate two-dimensional code information, and register the information to the device server, so that the device server acquires a network address and the identifier of the remote device.

In this case, the current device and the remote device establish a communication forwarding channel therebetween by using the device server.

Figure 7:
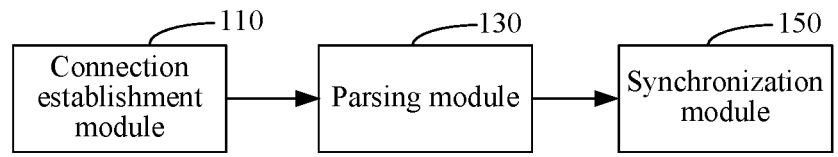
FIG. 7 is a schematic structural diagram of a system for network interconnection between devices according to an embodiment.

As shown in FIG. 7, in an embodiment, a system for network interconnection between devices includes a connection establishment module 110, a parsing module 130, and a synchronization module 150.

The connection establishment module 110 is configured to establish a connection between a current device and a remote device in at least one preset connection manner.

In this embodiment, multiple connection manners are preset. During connection establishment between the current device and the remote device, the connection establishment module 110 in the current device establishes a connection between the current device and the remote device by sequentially using multiple preset connection manners, till the current device is successfully connected to the remote device.

Specifically, the connection establishment module 110 uses the multiple preset connection manners one by one in a use sequence corresponding to the connection manners, and after the current device is successfully connected to the remote device in a certain connection manner, a next connection manner is not used.

The parsing module 130 is configured to parse operation data obtained by collection to obtain event information triggered in the current device, wherein the operation data is generated by an operation triggered in the current device.

In this embodiment, various sensors are built in the current device to collect an operation triggered in the current device by a user, to obtain corresponding operation data. In this case, the parsing module 130 in the current device parses the operation data obtained by collection, to obtain corresponding event information, and then responds to and gives feedback on the operation of the users according to the event information.

The synchronization module 150 is configured to synchronize the event information to the remote device via the established connection, so as to synchronize the operation triggered in the current device to the remote device.

In this embodiment, the synchronization module 150 synchronizes the event information to the remote device via the connection successfully established between the current device and the remote device, so that the remote device responds to and gives feedback on the operation triggered in the current device by the user.

With the above technical solution, an operation triggered in a current device can be synchronized to a remote device, and then the remote device responds to the operation and gives feedback to a user who triggers the operation. For example, sensing devices such as a gyroscope, a gravity sensor, and a light sensor are built in the current device, so as to collect various operations triggered in the current device by the user. For example, when the user picks up the current device and waves it in the air, data about a change in the gyroscope is acquired, that is, data of a track of the current device across the air, where the data of the track is operation data. In this case, the operation data is parsed to obtain corresponding event information, and the event information is transmitted to the remote device via the connection established with the remote device, where the remote device may be a computer; and in this case, the computer that receives the event information controls a mouse cursor to move along the track corresponding to the event information, so as to synchronize the operation of the user in the current device to the remote device, thereby implementing operation synchronism between devices.

Figure 8:
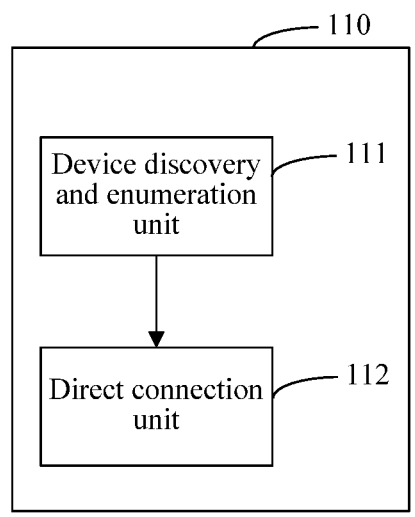
FIG. 8 is a schematic structural diagram of a connection establishment module according to an embodiment.

As shown in FIG. 8, in an embodiment, the at least one connection manner includes a direct device connection, and the connection establishment module 110 includes a device discovery and enumeration unit 111 and a direct connection unit 112.

The device discovery and enumeration unit 111 is configured to obtain, according to the SSDP, remote devices matching the current device, and enumerate the remote devices matching the current device.

In this embodiment, the SSDP is a simple device discovery protocol in a uPnP protocol stack.

Specifically, devices that support the SSDP all mark provided service types by using a ssdp:alive method in the SSDP, and broadcast a message through specific ports in network segments, where the broadcast message includes information such as an address and the provided service types.

In this case, the device discovery and enumeration unit 111 in the current device searches, by using a ssdp:search method and according to the service types in the message, a network segment the current device is in for devices that use a same protocol, that is, devices that provide the same service types, where the devices are remote devices matching the current device.

There are generally multiple remote devices that match the current device and obtained from the same network segment, and in this case, the device discovery and enumeration unit 111 enumerates the multiple obtained remote devices matching the current device, so that a user having the current device performs selection from the multiple remote devices.

The direct connection unit 112 is configured to directly connect, according to a triggered device selection instruction, the current device and a remote device corresponding to the device selection instruction.

In this embodiment, the direct connection unit 112 acquires a device selection operation performed by the user on the enumerated multiple remote devices matching the current device, to obtain a device selection instruction, so as to directly connect the current device and the corresponding remote device according to the device selection instruction, thereby achieving a connection between the current device and the remote device.

Figure 9:
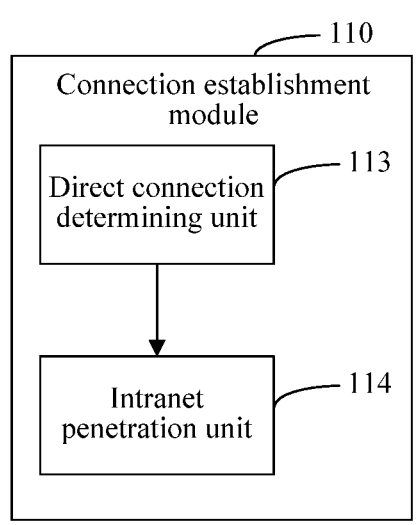
FIG. 9 is a schematic structural diagram of a connection establishment module according to another embodiment.

As shown in FIG. 9, in an embodiment, the at least one connection manner includes an intranet penetration manner, and the connection establishment module 110 includes a direct connection determining unit 113 and an intranet penetration unit 114.

The direct connection determining unit 113 is configured to determine whether the current device is successfully connected to the remote device via the direct device connection; if not, notify the intranet penetration unit 114; and if yes, notify the parsing module 130.

In this embodiment, among the multiple preset connection manners, a direct device connection manner is first used to make a connection attempt. Therefore, a connection manner of a direct device connection is first used to establish a connection between the current device and the remote device, and when the current device fails to be successfully connected to the remote device via the connection manner of a direct device connection, the intranet penetration unit 114 is notified, so as to establish a connection between the current device and the remote device in an intranet penetration manner.

When the direct connection determining unit 113 determines that the current device fails to be successfully connected to the remote device via the direct device connection, it indicates that the current device and the remote device are not in the same network segment, which results in an unsuccessful direction connection. The current device and the remote device that are not in the same network segment are in two different routing environments, and therefore, an attempt to establish a connection with the remote device is made in a connection manner of intranet penetration.

The intranet penetration unit 114 is configured to initiate an intranet penetration request to a device server, so as to perform intranet penetration by using the device server, to establish a connection with the remote device.

In this embodiment, the device server is used to implement intranet penetration between the current device and the remote device, so that the current device can establish a connection with the remote device.

The current device and the remote device that are in different routing environments cannot directly communicate with each other to send information to each other, and both the routing environment the current device is in and the routing environment the remote device is in only allow automatically and externally sent information to pass through them. Therefore, information directly sent from the current device to the remote device and information directly sent from the remote device to the current device are both discarded because a router thinks they are untrusted.

Therefore, to achieve communication between the current device and the remote device, the intranet penetration unit 114 in the current device is connected to a device server, so as to initiate an intranet penetration request to the device server, where the intranet penetration request includes a network address and a port number of the current device.

Correspondingly, the remote device also initiates an intranet penetration request to the device server, so as to notify the device server of a network address and a port number of the remote device.

In this case, the current device and the remote device both have sent information externally, a channel allowing data to come in and go out exists on each corresponding route, and the current device and the remote device both acquire the network address and the port number of each other by using the device server; therefore, a connection between the current device and the remote device can be directly established.

Figure 10:
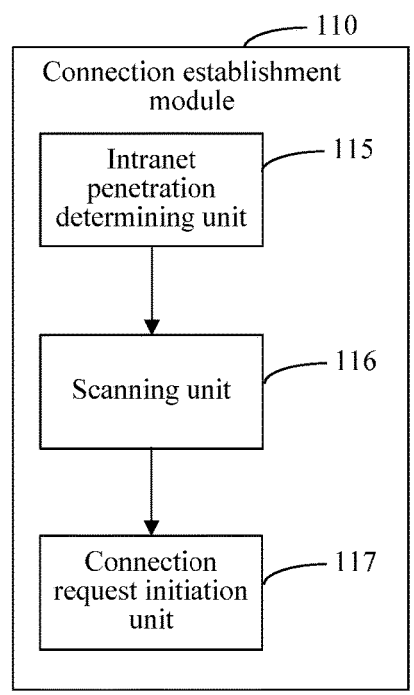
FIG. 10 is a schematic structural diagram of a connection establishment module according to another embodiment.

As shown in FIG. 10, in an embodiment, the connection manner includes background transfer, and the connection establishment module 110 includes an intranet penetration determining unit 115, a scanning unit 116, and a connection request initiation unit 117.

The intranet penetration determining unit 115 is configured to determine whether intranet penetration succeeds; if not, notify the scanning unit 116; and if yes, notify the parsing module 130.

In this embodiment, among the multiple preset connection manners, the direct device connection is used before the connection manner of intranet penetration. Therefore, during an attempt to establish a connection between the current device and the remote device in the connection manner of intranet penetration, if connection establishment fails, the scanning unit 116 is notified, so as to make an attempt to establish a connection between the current device and the remote device in a background transfer manner.

The scanning unit 116 is configured to scan bar code information generated in the remote device, to obtain an identifier of the remote device, where the bar code information is generated by the remote device and registered to the device server.

In this embodiment, after a connection between the current device and the remote device fails to be successfully established by means of intranet penetration, the remote device generates bar code information, a page displayed by the remote device is switched to a code scanning page including the bar code information, and the bar code information is registered to the device server, so that the device server acquires a network address and an identifier of the remote device.

In this case, the scanning unit 116 in the current device enables a code scanning function, so as to scan the bar code information on the code scanning page displayed by the remote device. In a preferred embodiment, the bar code information is two-dimensional code information.

The connection request initiation unit 117 is configured to pack the identifier of the remote device and an identifier of the current device to obtain a connection request packet, and send the connection request packet to the device server, so as to establish a communication forwarding channel between the current device and the remote device.

In this embodiment, the current device obtains the identifier of the remote device by scanning the bar code information; and the connection request initiation unit 117 packs the identifier of the remote device and the identifier of the current device to obtain a connection request packet, and send the connection request packet to the device server. In this case, the remote device has registered the bar code information to the device server after generating the bar code information; therefore, the device server can obtain the identifier of the current device and the identifier of the remote device by extraction from the received connection request packet initiated by the current device, and then obtain a network address of the remote device according to the identifier of the remote device, so as to establish and maintain the communication forwarding channel between the remote device and the current device.

During establishment of a connection between the current device and the remote device in the connection manner of background transfer, the device server is in charge of searching for two devices that match each other, that is, the current device and the remote device, establishing and maintaining the communication forwarding channel, and forwarding information between the current device and the remote device, so that the current device can receive information that is sent from the remote device to the device server and forwarded by the device server, and the remote device can also receive information that is sent from the current device to the device server and forwarded by the device server.

During an attempt to establish a connection between the current device and the remote device in a connection manner of a direct device connection, in a connection manner of intranet penetration, or in a connection manner of background transfer, the direct device connection is the fastest in connection speed, the intranet penetration is slower, and the background transfer is the slowest; and therefore, a sequence of using the connection manners is set as follows: the connection manner of a direct device connection is first used, and then the connection manner of intranet penetration is used, and the connection manner of background transfer is used in the last, so as to first attempt to establish a connection between the current device and the remote device in the fastest connection manner, thereby ensuring that the connection between the current device and the remote device is completed as fast as possible.

In another embodiment, the system further includes a packet assembly and compression module. The packet assembly and compression module is configured to perform packet assembly on the event information in a sequential generation order at a preset frequency and perform compression to obtain a compressed package.

In this embodiment, the current device that has multiple built-in sensors used to collect operation data samples the operation data at an extremely high frequency, such as near 100 Hz per second, and multiple pieces of event information obtained by parsing the operation data are assembled into one or more data packets for transmission.

A preset frequency is a frequency at which packet assembly is performed on the event information, which is less than the frequency at which the operation data is sampled, so as to avoid frequent packet transmission caused by a high packet assembly frequency and further avoid network congestion. For example, the preset frequency may be 2 to 10 packets per second, thereby ensuring a smooth feature, that is, smoothness, of responding and feeding back according to the event information by the remote device.

Specifically, the packet assembly and compression module assembles a preset number of pieces of event information obtained by parsing into a queue in a sequential order, to form a data packet, and then packet assembly is performed on the data packet at a preset frequency and compression is further performed, so as to avoid occupation of excessive network resources during sending of an excessively large data packet.

Further, the synchronization module 150 is further configured to synchronize the compressed package including the event information to the remote device via the established connection.

In this embodiment, the synchronization module 150 transmits the compressed package obtained by packet assembly and compression to the remote device via the established connection, so that the remote device responds to the operation triggered in the current device.

Figure 11:
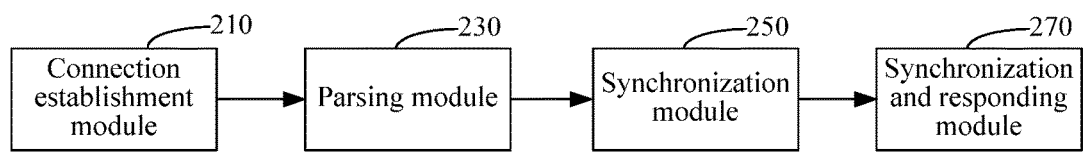
FIG. 11 is a schematic structural diagram of a system for network interconnection between devices according to another embodiment.

As shown in FIG. 11, in an embodiment, a system for network interconnection between devices includes a connection establishment module 210, a parsing module 230, a synchronization module 250, and a synchronization and responding module 270.

The connection establishment module 210 is configured to establish a connection between a current device and a remote device in at least one preset connection manner.

The parsing module 230 is configured to parse operation data obtained by collection to obtain event information triggered in the current device, where the operation data is generated by an operation triggered in the current device.

The synchronization module 250 is configured to synchronize the event information to the remote device via the established connection, so as to synchronize the operation triggered in the current device to the remote device.

The synchronization and responding module 270 is configured to receive the event information, and respond, in the remote device according to the event information, to the operation triggered in the current device.

The connection establishment module 210, the parsing module 230, and the synchronization module 250 run in the current device, and the synchronization and responding module runs in the remote device.

Figure 12:
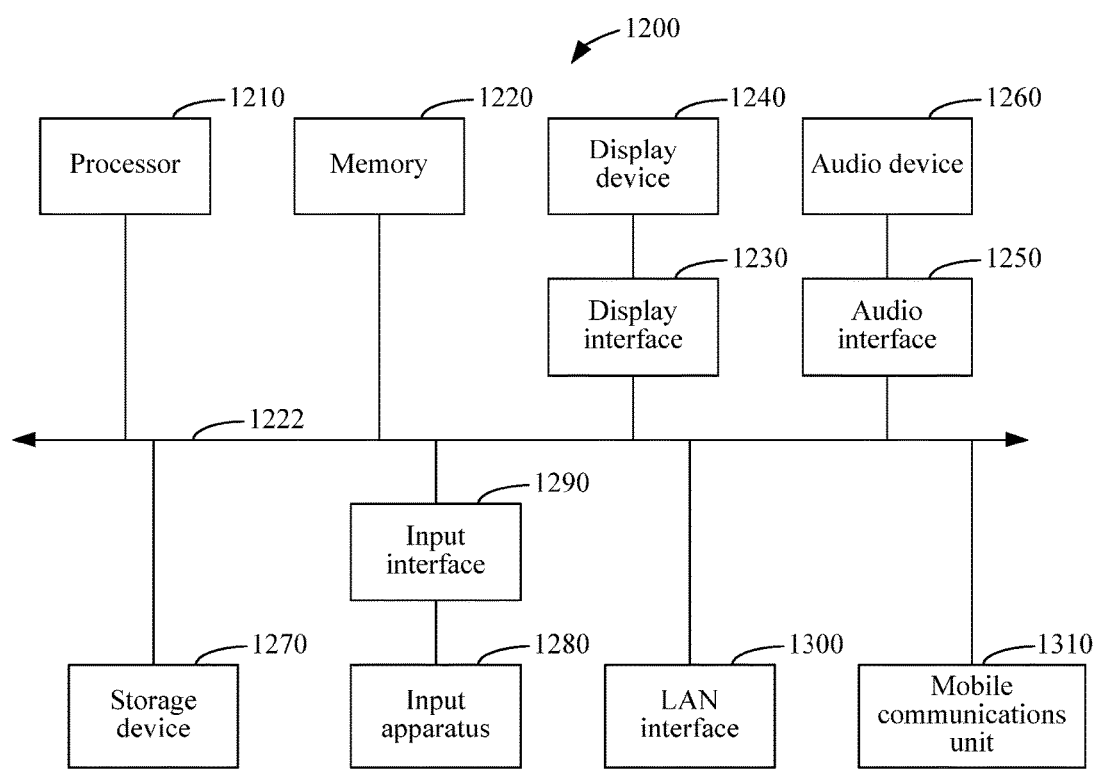
FIG. 12 is a modular diagram of a computer system according to an embodiment of the present invention.

FIG. 12 is a modular diagram of a computer system 1200 capable of implementing embodiments of the present invention. The computer system 1200 is merely an example of a computer environment applicable to the present disclosure, which shall not be construed as a limit to an application scope of the present disclosure. The computer system 1200 also shall not be construed to necessarily depend on or have one component or a combination of more components in the exemplary computer system 1200 shown in the figure.

The computer system 1200 shown in FIG. 12 is an example of a computer system applicable to the present disclosure. Another architecture having a different subsystem configuration may also be used, for example, a desktop computer, a notebook computer, a personal digital assistant, a smart phone, a tablet computer, a portable media player, a set top box, and other like devices that are familiar to the public and applicable to some embodiments of the present invention, but the present disclosure is not limited to the devices listed above.

As shown in FIG. 12, the computer system 1200 includes a processor 1210, a memory 1220, and a system bus 1222. System assemblies including the memory 1220 and the processor 1210 are connected to the system bus 1222. The processor 1220 is hardware used for executing computer program instructions by using basic arithmetic and logical operations in the computer system. The memory 1220 is a physical device used for temporarily or permanently storing computer programs or data (for example, program status information). The system bus 1220 may be of any one of the following types of bus structures: a memory bus or a storage controller, a peripheral bus, and a local bus. The processor 1210 can perform data communication with the memory 1220 by using the system bus 1222. The memory 1220 includes a read only memory (ROM) (not shown in the figure) or a flash memory (not shown in the figure), and a random access memory (RAM), where the RAM generally refers to a main memory to which an operating system and application programs are loaded.

The computer system 1200 further includes a display interface 1230 (for example, an image processing unit), a display device 1240 (for example, a liquid crystal display), an audio interface 1250 (for example, an audio card), and an audio device 1260 (for example, a loudspeaker). The display device 1240 and the audio device 1260 are media devices used for experiencing media content.

The computer system 1200 generally includes a storage device 1270. The storage device 1270 may be selected from multiple computer readable mediums, where the computer readable medium refers to any usable medium that can be accessed by the computer system 1200, including two kinds of mediums: a mobile medium and a fixed medium. For example, the computer readable mediums include, but are not limited to, a flash memory (a micro SD card), a Compact Disc Read-Only Memory (CD-ROM), a digital versatile disc (DVD) or another disc storage, a cassette, a tape, a magnetic disc storage or another magnetic storage device, and any other mediums that are used for storing required information and can be accessed by the computer system 1200.

The computer system 1200 further includes an input apparatus 1280 and an input interface 1290 (for example, an TO controller). A user can input instructions and information to the computer system 1200 by using the input apparatus 1080, such as a key board, a mouse, or a touch panel device on the display device 1240. The input apparatus 1280 is generally connected to the system bus 1222 by using the input interface 1290, and may also be connected to the system bus 1222 by using another interface or bus structure, such as a Universal Serial Bus (USB).

The computer system 1200 may be logically connected to one or more network devices in a network environment. The network device may be a personal computer, a server, a router, a smart phone, a tablet computer, or another public network node. The computer system 1200 is connected to the network device by using a local area network (LAN) interface 1300 or a mobile communications unit 1310. The LAN is a computer network that interconnects computers within a limited area such as a home, school, computer laboratory, or office building, using network media. Ethernet over twisted pair cabling, and WiFi are the two most common technologies currently used to build LANs. WiFi is a technology that allows the computer system 1200 to exchange data or connect to the wireless network via radio waves. The mobile communications unit 1310 can move within a wide geographical area, and answer and make a call through a radio communications link. In addition to the call, the mobile communications unit 1310 further supports Internet access in a 2G, 3G, or 4G cellular communications system that provides mobile data services.

It should be noted that, another computer system including sub-systems more or less than those of the computer system 1200 may also be applicable to the present disclosure. For example, the computer system 1200 may include a bluetooth unit that can exchange data in a short distance, an image sensor for photographing, and an accelerometer for measuring the accelerated speed.

As described above, the computer system 1200 applicable to the present disclosure can execute operations specified by a method for network interconnection between devices. The computer system 1200 executes these operations in the form of running software instructions in the computer readable medium by the processor 1210. These software instructions may be read from the storage device 1270 to the memory 1220, or read from another device to the memory 1220 through the LAN interface 1300. The software instructions stored in the memory 1220 instructs the processor 1210 to execute the method for network interconnection between devices. In addition, the present disclosure may also be implemented by a hardware circuit or by a combination of the hardware circuit and the software instructions. Therefore, the implementation of the present disclosure is not limited to any combination of a specific hardware circuit and software.

The above embodiments merely describe some implementation manners of the present disclosure, and are specifically illustrated in detail, but shall not be construed as a limit to a patent scope of the present disclosure. It should be noted that, persons of ordinary skill in the art may make improvements and modifications without departing from the idea of the present disclosure, and the improvements and modifications shall fall within the protection scope of the present disclosure. Therefore, the protection scope of the present disclosure is subject to the appended claims.

What is claimed is:

1. A method for network interconnection between devices comprising:
    establishing a connection between a current device and a remote device in at least one preset connection manner;
    parsing operation data obtained by collection to obtain event information triggered in the current device, wherein the operation data is generated by an operation triggered in the current device; and
    synchronizing the event information to the remote device via the established connection, so as to synchronize the operation triggered in the current device to the remote device;
    wherein for the at least one preset connection manner comprising a direct device connection, the establishing a connection between a current device and a remote device in at least one preset connection manner comprises:
    obtaining remote devices matching the current device according to the Simple Service Discovery Protocol (SSDP), and enumerating the remote devices matching the current device; and
    directly connecting, according to a triggered device selection instruction, the current device and a remote device corresponding to the device selection instruction;
    wherein for the at least one preset connection manner comprising an intranet penetration manner, the establishing a connection between a current device and a remote device in at least one preset connection manner comprises:
    determining whether the current device is successfully connected to the remote device via the direct device connection, and if not,
    initiating an intranet penetration request to a device server, so as to perform intranet penetration by using the device server, to establish a connection with the remote device;
    wherein for the at least one preset connection manner comprising background transfer, the establishing a connection between a current device and a remote device in at least one preset connection manner comprises:
    determining whether the intranet penetration succeeds, and if not,
    scanning bar code information generated in the remote device, to obtain an identifier of the remote device, wherein the bar code information is generated by the remote device and registered to the device server; and
    packing the identifier of the remote device and an identifier of the current device to obtain a connection request packet, and sending the connection request packet to the device server, so as to establish a communication forwarding channel between the current device and the remote device.

2. The method according to claim 1, wherein before the synchronizing the event information to the remote device via the established connection, the method comprises:
    performing packet assembly on the event information in a sequential generation order at a preset frequency and performing compression to obtain a compressed package, wherein
    the synchronizing the event information to the remote device via the established connection comprises:
    synchronizing the compressed package comprising the event information to the remote device via the established connection.

3. A method for network interconnection between devices comprising:
    establishing a connection between a current device and a remote device in at least one preset connection manner;
    parsing operation data obtained by collection to obtain event information triggered in the current device, wherein the operation data is generated by an operation triggered in the current device;
    synchronizing the event information to the remote device via the established connection, so as to synchronize the operation triggered in the current device to the remote device; and
    receiving the event information by using the remote device, and responding, in the remote device according to the event information, to the operation triggered in the current device;
    wherein for the at least one preset connection manner comprising a direct device connection, the establishing a connection between a current device and a remote device in at least one preset connection manner comprises:
    obtaining remote devices matching the current device according to the Simple Service Discovery Protocol (SSDP), and enumerating the remote devices matching the current device; and
    directly connecting, according to a triggered device selection instruction, the current device and a remote device corresponding to the device selection instruction;
    wherein for the at least one connection manner comprising an intranet penetration manner, the establishing a connection between a current device and a remote device in at least one preset connection manner comprises:

determining whether the current device is successfully connected to the remote device via the direct device connection, and if not, initiating an intranet penetration request to a device server, so as to perform intranet penetration by using the device server, to establish a connection with the remote device;

wherein for the at least one preset connection manner comprising background transfer, the establishing a connection between a current device and a remote device in at least one preset connection manner comprises:

determining whether the intranet penetration succeeds, and if not, scanning bar code information generated in the remote device, to obtain an identifier of the remote device, wherein the bar code information is generated by the remote device and registered to the device server; and packing the identifier of the remote device and an identifier of the current device to obtain a connection request packet, and sending the connection request packet to the device server, so as to establish a communication forwarding channel between the current device and the remote device.

4. The method according to claim 3, wherein before the synchronizing the event information to the remote device via the established connection, the method comprises:

performing packet assembly on the event information in a sequential generation order at a preset frequency and performing compression to obtain a compressed package; and the synchronizing the event information to the remote device via the established connection comprises:

synchronizing the compressed package comprising the event information to the remote device via the established connection.

5. A system for network interconnection between devices comprising:

a processor and a non-transitory storage, wherein the non-transitory storage stores one or more computer readable instructions, and the processor executes the computer readable instructions stored in the non-transitory storage to:

establish a connection between a current device and a remote device in at least one preset connection manner;

parse operation data obtained by collection to obtain event information triggered in the current device, wherein the operation data is generated by an operation triggered in the current device; and synchronize the event information to the remote device via the established connection, so as to synchronize the operation triggered in the current device to the remote device;

wherein for the at least one preset connection manner comprising a direct device connection, the processor executes the computer readable instructions stored in the non-transitory storage to:

obtain remote devices matching the current device according to the Simple Service Discovery Protocol (SSDP), and enumerate the remote devices matching the current device; and directly connect, according to a triggered device selection instruction, the current device and a remote device corresponding to the device selection instruction;

wherein for the at least one preset connection manner comprising an intranet penetration manner, the processor executes the computer readable instructions stored in the non-transitory storage to:

determine whether the current device is successfully connected to the remote device via the direct device connection, and if not, initiate an intranet penetration request to a device server, so as to perform intranet penetration by using the device server, to establish a connection with the remote device;

wherein for the at least one connection manner comprising background transfer, the processor executes the computer readable instructions stored in the non-transitory storage to:

determine whether the intranet penetration succeeds, and if not, scan bar code information generated in the remote device, to obtain an identifier of the remote device, wherein the bar code information is generated by the remote device and registered to the device server; and pack the identifier of the remote device and an identifier of the current device to obtain a connection request packet, and send the connection request packet to the device server, so as to establish a communication forwarding channel between the current device and the remote device.

6. The system according to claim 5, wherein the processor executes the computer readable instructions stored in the non-transitory storage to:

perform packet assembly on the event information in a sequential generation order at a preset frequency and perform compression to obtain a compressed package, synchronize the compressed package comprising the event information to the remote device via the established connection.

* * * * *